United States Patent Office 2,714,287
Patented Aug. 2, 1955

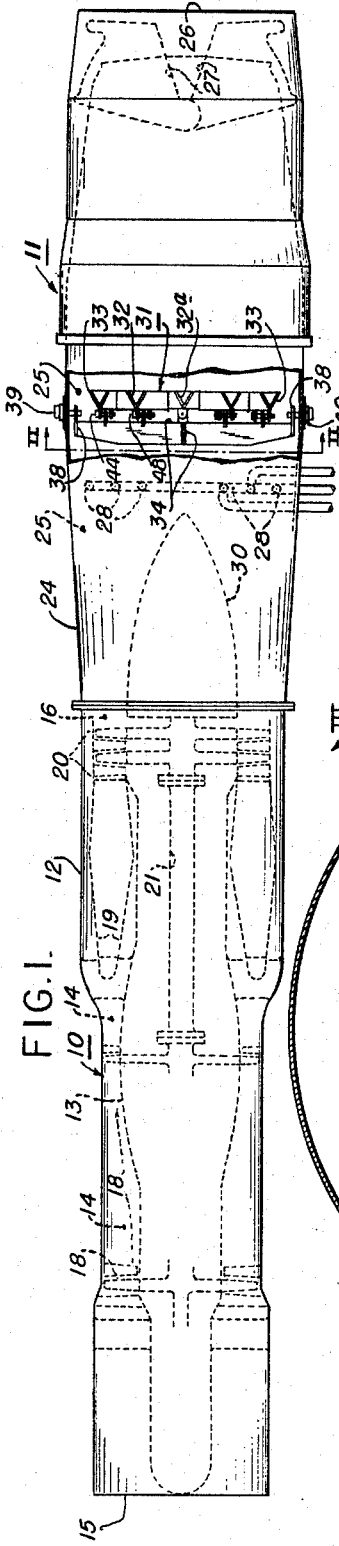

2,714,287

FLAMEHOLDER DEVICE FOR TURBOJET AFTERBURNER

John C. Carr, Norwood, Pa., assignor to Westinghouse Electric Corporation, East Pittsburgh, Pa., a corporation of Pennsylvania Application January 3, 1950, Serial No. 136,542

1 Claim. (Cl. 60—39.32)

This invention relates to power plants, and more particularly to an aviation power plant of the jet propulsion class.

In order to render available maximum propulsion energy output of an aviation jet propulsion power plant, such as a turbojet engine, it has been proposed to interpose suitable afterburner apparatus between the turbine and the jet nozzle, whereby additional fuel can be burned in the stream of gases flowing from the turbine to augment the thrust established by the jet issuing from the nozzle. The velocity of turbine exhaust gases flowing through such an afterburner is normally greater than fifty feet per second, tending to exceed that of the flame of combustion of the afterburner fuel, and is preferably controlled by imposition of a perforated baffle or flameholder in the gas stream, so that sufficient local stagnation can be produced to ensure that the flame will be maintained in the desired combustion region of the power plant. It is a principal object of the present invention to provide an improved flame-holder device of this type.

Another object of the invention is the provision of a sectional flame-holder device for the afterburner apparatus of a turbojet engine, comprising relatively displaceable elements so mounted as to prevent differential thermal expansion and contraction thereof from causing binding or distortion of the assembled structure.

These and other objects are effected by my invention as will be apparent from the following description and claim taken in connection with the accompanying drawing, forming a part of this application, in which:

Fig. 1 is a diagrammatic elevational view; partly in section, of a typical turbojet power plant equipped with an improved flame-holder device constructed in accordance with the invention;

Fig. 2 is an enlarged detail, sectional view of the flame-holder and related structure, taken along the line II—II of Fig. 1; and Fig. 3 is a fragmentary sectional view, in enlarged detail, of a portion of the flame-holder apparatus, taken along the line III—III of Fig. 2.

The power plant shown schematically in Fig. 1 includes a gas turbine engine 10 and an afterburner apparatus 11, which are adapted to be mounted in the fuselage or wing of an aircraft (not shown). The gas turbine engine 10 comprises a generally cylindrical casing structure 12 having mounted along the axis thereof an inner sectional core structure 13, the annular space formed between the two structures constituting a fluid flow passageway 14 which extends through the engine envelope from a forwardly directed air inlet opening 15 to a turbine exhaust communication 16. The operating elements of the engine are mounted in axial alignment within the casing structure 12, in order to minimize the frontal dimensions of the engine and consequent drag thereof during flight of the aircraft. These elements comprise an axial-flow compressor 18, annular combustion apparatus 19 and a turbine 20, the rotor of which is operatively connected to the rotor of the compressor 18 by a shaft 21 having suitable journaled support in the casing structure.

The afterburner apparatus 11 comprises a cylindrical casing structure 24, the forward end of which is suitably fitted to the complementary turbine discharge end of the engine casing structure 12, so that the interior space or combustion chamber 25 of the afterburner apparatus communicates with the turbine discharge passage 16. The afterburner combustion chamber 25 extends axially through the casing structure 24 to a rearwardly disposed exhaust nozzle 26, which may be equipped with suitable variable flow controlling mechanism 27, if desired. Mounted within the combustion chamber 25 are a plurality of fuel supply manifolds 28, which are adapted to be connected to a suitable afterburner fuel control system (not shown). The manifolds 28 may be supported in radially disposed struts (not shown) extending from the casing structure 24. An axially arranged fairing 30, also carried on suitable struts (not shown), may be disposed immediately downstream of the turbine 20 in the engine 10, for defining the annular turbine discharge passage 16 which merges with the combustion chamber 25 of the afterburner 11.

In operation of the power plant, air entering the inlet opening 15 is compressed by the compressor 18 and delivered to the annular combustion apparatus 19 for supporting combustion of fuel that is supplied thereto through the medium of suitable nozzles (not shown). The resultant hot motive fluid issuing from the combustion apparatus 19 is then expanded through the turbine 20 and exhausted into the combustion chamber 25 of the afterburner apparatus, where additional fuel sprayed from the manifolds 28 toward a flame-holder device 31, hereinafter described, may be burned to augment the thrust energy of the gases finally discharged through the nozzle 26.

According to the invention, the flame-holder device 31 is mounted in the combustion chamber 25 of the afterburner apparatus 11 at a position downstream of the manifolds 28 but well in advance of the nozzle 26, as shown in Fig. 1. The flame-holder device 31 comprises a plurality of spaced concentric rings 32 and 33 supported on radially disposed struts 34, which are welded or otherwise secured together at a common axial point 35 and are movably secured to the casing 24, as best shown in Fig. 2. In the present disclosure of the invention, two concentric rings are supported on four radial struts, spaced ninety degrees apart, although other symmetrical arrangements of rings and struts may be employed if preferred. As shown in Fig. 3, each of the struts 34 terminates in a bracket 38, which is spaced inwardly of the casing 24 and has an aperture for receiving the inner end of a pin 39 that is mounted in screw-threaded relation in a suitable boss 40 carried by the casing. With each of the struts 34 thus slidably supported, radial displacement of the ends thereof during thermal expansion is accommodated without stressing of the casing structure.

The inner and outer rings 32 and 33 are preferably V-shaped in cross-section, and are adapted to be mounted downstream of the supporting struts 34 with the apex of each ring pointed upstream, as shown in Fig. 3. The outer ring 33 has a plurality of radial V-shaped extensions 33a, corresponding in number and position to the struts 34, each of which extensions carries a pair of lugs 43 that are adapted to be slidably connected to a pin 44 carried by a parallel lug 45 suitably disposed on the adjacent strut 34. The inner ring 32 is provided with a like number of radial V-shaped extensions 32a, the outer ends of which are disposed in slidable, overlapping relation with respect to the respective extensions 33a, as best shown in Fig. 2. Formed on the apex of each of the extensions 32a are lugs 47, which are slidably connected to a pin 48 carried by one of a plurality of lugs 49 suitably disposed on the adjacent struts 34. It will be noted that the respective sets of pins 44 and 48 are parallel to the associated struts 34, so that upon relative expansion or contraction of the rings 32 and 33, free sliding motion of the lugs carried on the pins will prevent undue warping or stress of the flame-holder assembly, or transmission of strains to the outer casing structure. It will be apparent that, since the strut pins 39 and the several sets of pins 44 and 48 are adapted to be removed when desired, the separate elements of the assembly may readily be removed for repairs or replacement.

From the foregoing, it will thus be seen that a flame-holder device constructed in accordance with the invention will present sufficient drag or surface area to facilitate proper retention of a fuel combustion flame within the desired zone of any conventional afterburner apparatus of generally tubular construction, through which the gases are conducted at a velocity in excess of fifty feet per second. The relatively loosely connected elements of the improved flame-holder assemblage are adapted to expand and contract independently, to avoid undue stressing of the assemblage or of the surrounding casing structure upon sudden changes in thermal characteristics. With the flame-holder device supported from the casing through the medium of pins having limited contact areas, local transfer of heat to the casing structure is minimized. In addition, the separate elements of the assembly are individually replaceable in the event of failure of any part in service, without necessitating the discarding of other elements in good condition.

While I have shown the invention in but one form, it will be obvious to those skilled in the art that it is not so limited, but is susceptible of various changes and modifications without departing from the spirit thereof.

What I claim is:

In an afterburner apparatus for a turbojet engine, cylindrical casing structure forming an elongate combustion chamber through which burning fuel and hot gases are propelled at high velocity, and a flameholder assembly interposed in the combustion gas stream for effecting sufficient stagnancy to retain the flame formation therein, said assembly comprising a plurality of circumferentially spaced boss portions carried on said casing structure, an equal number of pins mounted radially in the respective boss portions, radially disposed struts having outer ends slidably mounted on said pins, respectively, said struts being secured at their intersection on the axis of said casing structure and having apertured lugs disposed at points intermediate said intersection and said outer ends, concentric outer and inner annular members of V-shaped cross section, said outer annular member having a plurality of radially inwardly projecting V-shaped arm portions aligned with said struts and terminating outwardly of said inner annular member, said inner annular member having similarly disposed V-shaped cross portions having outwardly projecting ends engaged in overlapping relation with said arm portions of the outer member, a plurality of apertured lugs carried on said arm portions and said cross portions, and means loosely connecting said annular members to said struts including radial pins radially aligned with said struts and connecting adjacent sets of said lugs for permitting relative thermal expansion of said assembled elements without imposition of strain on said casing structure.

References Cited in the file of this patent

UNITED STATES PATENTS

| | | |
|---|---|---|
| 2,385,833 | Nahigyan | Oct. 2, 1945 |
| 2,481,547 | Walker | Sept. 13, 1949 |
| 2,482,505 | Pierce | Sept. 20, 1949 |
| 2,494,659 | Huyton | Jan. 17, 1950 |
| 2,510,645 | McMahan | June 6, 1950 |
| 2,516,819 | Whittle | July 25, 1950 |
| 2,529,506 | Lloyd et al. | Nov. 14, 1950 |
| 2,540,594 | Price | Feb. 6, 1951 |
| 2,547,619 | Buckland | Apr. 3, 1951 |
| 2,548,430 | Goddard | Apr. 10, 1951 |